United States Patent [19]

Salmela

[11] Patent Number: 4,842,105
[45] Date of Patent: Jun. 27, 1989

[54] SAFETY BRAKE MECHANISM

[75] Inventor: Gordon O. Salmela, Lexington, Mass.

[73] Assignee: Raytheon Company, Lexington, Mass.

[21] Appl. No.: 57,395

[22] Filed: Jun. 1, 1987

[51] Int. Cl.$^4$ .......................... B60T 8/52; B60T 7/12; B66R 1/26; B66B 5/16
[52] U.S. Cl. ................ 188/185; 188/181 H; 187/19; 187/38; 187/73
[58] Field of Search ........... 188/180, 184, 185, 181 A; 187/38, 73, 19

[56] References Cited

U.S. PATENT DOCUMENTS

| | | | |
|---|---|---|---|
| 1,117,098 | 11/1914 | Sherman | 188/185 X R |
| 1,191,254 | 7/1916 | White | 188/184 |
| 2,001,714 | 5/1935 | Ehret | 188/185 X |
| 2,896,912 | 7/1959 | Fagier et al. | 188/185 X |
| 3,415,343 | 12/1968 | Svensson | 187/19 |
| 3,717,954 | 2/1973 | Sheckells | 188/185 X |
| 4,044,969 | 8/1977 | Wallin | 188/184 X |
| 4,103,760 | 8/1978 | Yang | 188/134 |
| 4,127,240 | 11/1978 | Keil . | |
| 4,355,540 | 10/1982 | Chombard et al. | 74/5.1 |
| 4,475,697 | 10/1984 | Wyder . | |
| 4,556,155 | 12/1985 | Koppensteiner | 187/38 |
| 4,624,422 | 11/1986 | Hollowell . | |

FOREIGN PATENT DOCUMENTS 0520514 2/1931 Fed. Rep. of Germany ...... 188/184

Primary Examiner—Andres Kashnikow
Assistant Examiner—Richard Potosnak
Attorney, Agent, or Firm—Walter F. Dawson; Richard M. Sharkansky

[57] ABSTRACT

An acceleration-sensitive safety brake having two semi-cylindrical flyweights in a single plane, connected near the geometric center of their semi-circular cross-section to eccentric pivot pins protruding from a rotating hub for limiting the acceleration of an apparatus. The flyweights are held in a centered position during normal operation by the force of a helical spring acting on split halves of semicylindrical cavities in each of the adjacent faces of the flyweights. The flyweights are located in cylindrical hole of a fixed housing which is concentric with the rotating hub. Rapid angular acceleration of the hub applies both a rotational and translational motion to the flyweights. Whenever the pivot pins apply a force to the flyweights which is greater than the force exerted by the centering spring, the flyweights move in opposite directions, relative to each other, and push against the fixed housing creating a braking action. The material chosen for flyweights is hard rubber, and a preselected ratio of the flyweight radius to pivot pin eccentricity radius make the mechanism self-locking as long as input torque remains applied to the hub.

23 Claims, 3 Drawing Sheets

SAFETY BRAKE MECHANISM

The Government has rights in this invention pursuant to Contract No. DTFAOl-84-C-0039 awarded by Federal Aviation Aministration.

BACKGROUND OF THE INVENTION

This invention relates to rotary motion control based on sensing rotary acceleration and in particular to a safety brake mechanism.

Equipment consoles for housing electronic test equipment or computer-display equipment often have a horizontal shelf for holding a keyboard and other operator interface controls or display equipment. Such a shelf may be adjustable in the vertical direction and such adjustment is usually manual by releasing a latch and lifting or lowering the shelf on rolling bearings. One example of an equipment console for an air traffic control application has an equipment shelf plus other associated moving parts weighing approximately 125 lbs. This shelf is counterbalanced to within 5 lbs. to minimize operation effort and has a vertical travel length of 10 inches. Considerable energy is stored in this shelf system due to the large weight operating over the large travel range. At the upper position, the shelf mass has potential energy due to its elevation; at the lower position the counterbalance has the same amount of energy stored up in order to help lift the shelf when required. Both types of stored energy are a hazard to operating personnel if the mechanism fails or is misused.

A sudden unexpected shelf motion can result from three sources such as counterbalance spring breakage, overloading the shelf or by removing part or all of the mass of the shelf by disassembly. Each of these conditions cause a force imbalance, which if released would result in rapid movement and potential operator injury. The release of the unbalanced force could occur by latch failure or by unintentional manual latch operation. Therefore, it is very desirable to limit shelf speed to a safe value with a safety brake. Such a brake has to be relatively inexpensive, reliable and contribute only negligible drag during normal shelf operation, and the brake engagement must occur for movement in either direction.

SUMMARY OF THE INVENTION

In accordance with the present invention, a safety brake mechanism is provided for limiting the acceleration of an apparatus according to a predetermined specification. A pair of semi-cylindrical flyweights are coupled together with a helical spring and they initiate a braking action in response to an acceleration above a predetermined level. The helical spring is coupled between the pair of flyweights and centers the flyweights with respect to each other when the apparatus is not exceeding the predetermined acceleration level. A rotating shaft is coupled between the flyweights and the apparatus for transferring the apparatus acceleration to the flyweights. A fixed housing concentric with the rotating shaft encloses the flyweights and provides the braking action in combination with the flyweights. The flyweights become displaced relative to each other in response to the predetermined acceleration of the rotating shaft and make contact with an inside surface of the fixed housing causing frictional forces to stop the shaft rotation. Attached to the shaft is a hub having two pivot pins for attaching the pair of flyweights using a pivot pin for each flyweight. The ratio of a radius of one of the flyweights to a radius of the pivot pin location in that flyweight is preselected to make the safety brake mechanism self-locking.

In accordance with the present invention, an equipment console including a moveable operator's shelf having a safety brake is provided. The safety brake comprises rack and pinion gears coupled to the shelf for facilitating and sensing the motion of the shelf, a pair of semi-cylindrical flyweights coupled together for providing a braking action in response to an acceleration of the shelf above a predetermined level, a spring coupled between the pair of flyweights in a compressed state for centering the flyweights with respect to each other when the shelf is not exceeding the predetermined acceleration level, a hub coupled between the rack and pinion gears and the pair of flyweights for transferring the shelf acceleration to the flyweights, and a fixed housing concentric with the hub and enclosing the flyweights for providing the braking action in combination with the flyweights. The flyweights become displaced relative to each other in response to the predetermined acceleration of the shelf, and the displaced flyweights provide contact with an inside surface of the housing causing frictional forces to stop the motion of the shelf. A first portion of the spring is positioned in a pocket of a first one of the pair of flyweights and a second portion of the spring is positioned in a pocket of a second one of the pair of flyweights for centering the flyweights with respect to each other when the shelf acceleration is below the predetermined level.

In accordance with a further feature of the invention, a method of limiting acceleration of a moving apparatus with a safety brake is provided comprising the steps of providing a pair of flyweights having a compressed spring positioned within a portion of each of the flyweights, enclosing the pair of flyweights in a fixed housing concentric with the flyweights, transferring the apparatus acceleration to the flyweights by rotating means, and generating frictional forces to stop the moving apparatus by the flyweights becoming displaced from a center position relative to each other in response to a predetermined acceleration level and contacting an inside surface of the fixed housing. The flyweights return to a center position as a result of forces provided by the compressed spring after the acceleration goes below the predetermined level causing the frictional forces to terminate.

DESCRIPTION OF THE PREFERRED EMBODIMENT

Figure 1:
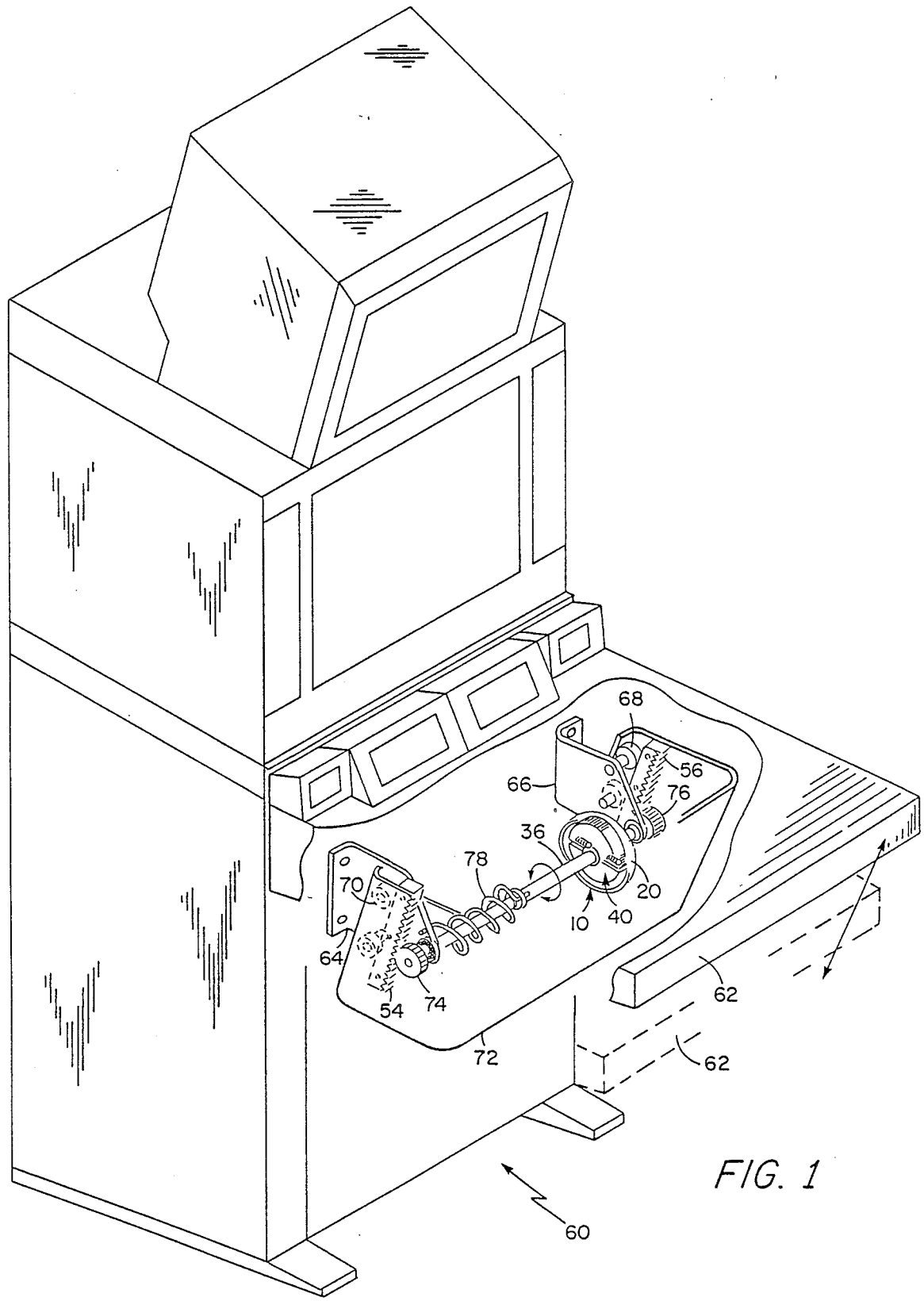
FIG. 1 is a perspective view of a safety brake invention mounted in a moveable shelf which is attached to the front of an equipment console.

Referring to FIG. 1, there is shown an equipment console 60 with a shelf assembly 62 which is adjustable in the vertical direction and has a safety brake mechanism 10 attached therein. Fixed brackets 64, 66 mounted to the frame of the equipment console 60 have rack gears 54, 56 attached thereto, and rollers 68, 70 attached to the sides of the brackets 64, 66 are positioned behind the rack gears 54, 56. The shelf assembly 62 comprises a frame 72 which has a housing 20 that is concentric with a shaft or driving means 36 and encloses a flyweight assembly 40 of the safety brake mechanism 10. The sides of the frame 72 which is attached to the shelf assembly 62 curve around behind the rollers 68, 70 and guide the shelf assembly as it is raised and lowered to accommodate an equipment console operator. As the shelf assembly 62 is moved, pinion gears 74, 76 move along the rack gears 54, 56. The pinion gears 74, 76 are mounted to each end of a common shaft or driving means 36 spanning from one side of the shelf assembly 62 to the other side. A single safety brake mechanism 10 mounted to shaft 36 serves to protect the entire shelf assembly 62. A latch (not shown) is attached to the frame 72 and enables an operator to lock the shelf assembly 62 at any position along its 10-inch path of vertical movement.

Figure 2:
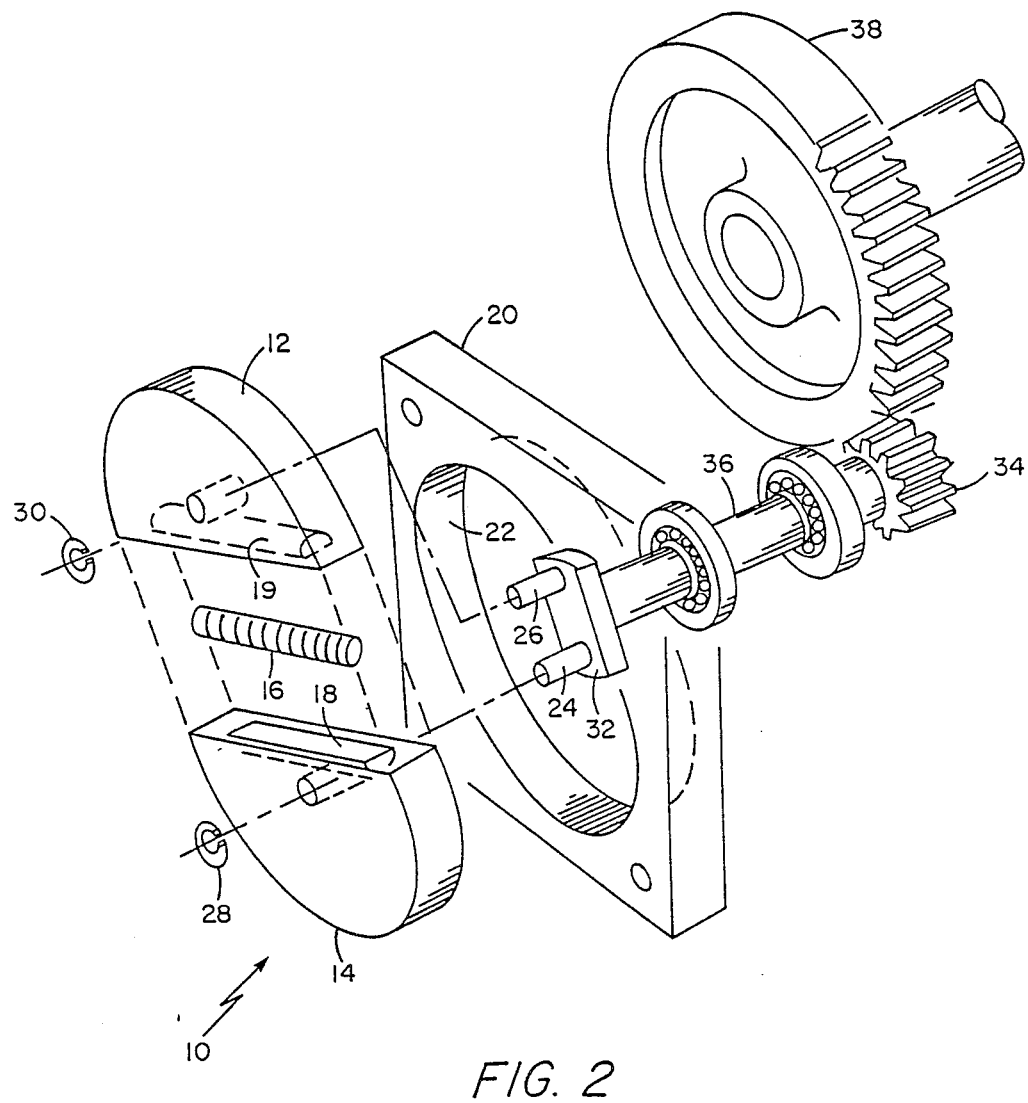
FIG. 2 is a perspective view of the safety brake mechanism with an exploded view of the flyweight assembly showing the two semi-cylindrical flyweights with a centering spring positioned half in each flyweight pocket for connecting the flyweights.

Referring now to FIG. 2, there is a shown a safety brake mechanism 10 according to the present invention with an exploded view of two semi-cylindrical weights 12 and 14 referred to as flyweights herein which are coupled together by a helical spring 16 in a single plane. The flyweights 12, 14 are mounted on two eccentric pivot pins 24 and 26 protruding from a rotating hub 32 and are attached to pins 24 and 26 by retainers 28 and 30. The spring 16 is positioned into a pair of semi-cylindrical cavities 18, 19 located in each of the adjacent faces of the flyweights 12, 14. The flyweights are enclosed in a fixed housing 20 having a cylindrical hole which is concentric with the rotating hub 32. The flyweights 12, 14 are held in a centered position during normal operation by the force of the helical spring 16 acting on the split halves of the semi-cylindrical cavities 18, 19 in each of the flyweights 12, 14. A driving means coupled between said flyweights 12, 14 and a rotary gear 34 transfers the acceleration of a apparatus 38, which is to be protected by the safety brake 10, to the flyweights 12, 14. Such apparatus 38 may be a rotary gear 38 as shown in FIG. 2 or a rack gear 54, 46 as shown in FIG. 1.

Figure 3:
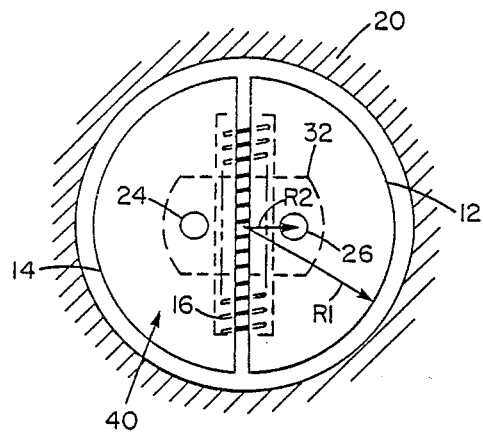
FIG. 3 is a view of the safety brake mechanism showing the flyweights in a symmetrical state.

Referring now to FIG. 3, the flyweight assembly 40 comprising flyweights 12, 14, and spring 16 is shown in a symmetrical state which occurs during uniform speed or when the driving means 36 is at a stopped condition. The flat adjacent surfaces of the flyweights 12, 14 each have a cavity 18, 19 for holding one-half of the helical centering spring 16. The helical spring 16 has a free length greater than the length of pockets or cavities 18, 19 and thus it is installed with a precompression. The precompression forces the flyweights to stay exactly symmetrical up to a critical acceleration at which point the spring is further compressed and the flyweights become displaced. The spring force (F) is determined by the mass of the flyweights, the geometry of the flyweights, and the preselected rotary or angular acceleration in accordance with the equation:

$$F = \left( .500 \frac{R}{b} - .424 \right) R \dot{\omega} M$$

For the case of a rack driving a pinion of radius r and the pinion turning the brake:

$$\dot{\omega} = \frac{a}{r} \text{ and } M = \frac{\pi R^2 \rho}{2}$$

Thus, the required spring force is $$F = \left( \frac{R}{2b} - .424 \right) R \left( \frac{a}{r} \right) \left( \frac{\pi R^2 \rho}{2} \right)$$

$$F = \frac{\pi}{4} \frac{R^3 a \rho}{r} \left( \frac{R}{b} - .849 \right)$$

Where
F = Centering Spring Force
$\dot{\omega}$ = Brake Angular Acceleration, Radians/Sec
R = Flyweight Radius, FT
a = Acceleration of Rack, FT/Sec$^2$
$\rho$ = Flyweight Density, Slugs/FT$^3$
r = Pinion Radius, FT
b = Pivot Pin Eccentricity, FT
M = Mass of Flyweight, Slugs Once spring force (F) is determined, then the spring geometry and amount of compression is selected to provide the spring force (F) within the flyweight pockets 18, 19.

The safety brake 10 of the present invention reacts to acceleration only, and it is unaffected by velocity or speed. The anticipated failure conditions foreseen result in a large force imbalance, and therefore produce a large acceleration. Normal operation results in approximately 0.05 "G" whereas the failure modes produce from 0.5 G to over 1.0 G. The 10:1 ratio of failure mode acceleration to design acceleration makes it practical to manufacture a brake which will never activate under normal operating conditions, but always engage under a predetermined failure condition.

Figure 4:
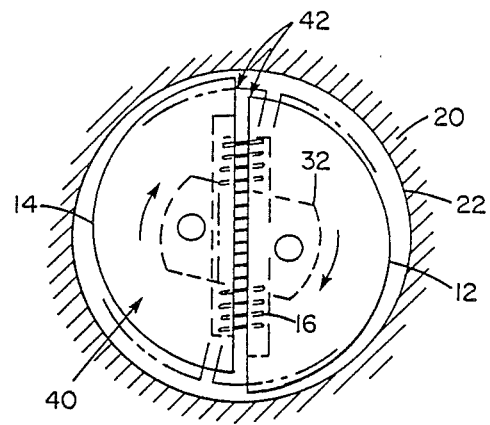
FIG. 4 is a view of the safety brake mechanism showing the flyweights being displaced and lagging the hub along with the spring being compressed as a result of a clockwise acceleration.

Referring now to FIG. 4, the flyweight assembly 40 is shown in a state of reaction to a clockwise acceleration of hub 32 which causes the displacement 42 of flyweights 12 and 14. The displacement 42 results from the flyweights 12, 14 lagging behind the hub 32 causing the helical spring 16 to be compressed. The outer curved perimeters of the flyweights 12, 14 contact the inside surface 22 of the surrounding housing 20 when the relative displacement 42 is sufficient to exceed the normal flyweight-to-housing clearance. The geometry of the flyweights 12 and 14 is such that the leading edges make contact with the inside surface 22 housing bore and "lock-up" at a predetermined rotary acceleration value thereby providing a safety brake for the protected mechanism 38. Built-in resiliency of the flyweights 12, 14 makes the lock-up gentle enough to prevent damage to the protected mechanism 38 whether it be a console or a shelf mechanism.

Figure 5:
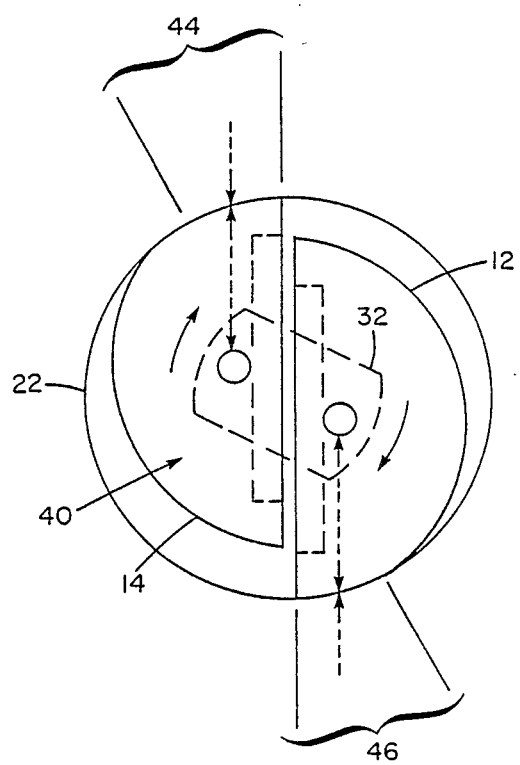
FIG. 5 is a view of the flyweights in a locked state against the housing as a result of a clockwise accelerations exceeding a threshold resulting in a braking action occurring.

Referring now to FIG. 3 and FIG. 5, FIG. 5 shows the flyweight assembly 40 in a locked state against clockwise torque. The ratio of flyweight assembly radius (R1) to pivot pin radius R2 (as shown in FIG. 3), which in the present embodiment is 4:1, is selected to make the brake self-locking with the existing coefficient of friction of the flyweight-to-housing interface. The self-locking effect causes input torque of any amount to generate a porportional amount of frictional force in the frictional contact zones 44, 46 so as to prevent slippage. The safety brake 10 will remain in a locked state as long as torque is applied. When the torque is removed, the friction of the outer perimeter of the flyweight assembly 40 disappears and the flyweights 12, 14 spring back to the symmetrical state shown in FIG. 3.

The flyweights 12, 14 may be embodied with hard rubber such as Hytrel ® thermoplastic elastomer manufactured by Dupont Co. of Wilmington, Del. having a Shore D55 hardness. Such material provides sufficient coefficient of friction at the flyweight assembly 40 outer perimeter and also provides some compliance to the brake upon lockup. The remaining parts except for the helical spring 16 which is described hereinbefore are conventional metals readily known to one skilled in the art.

This concludes the description of the preferred embodiment. However, many modifications and alterations will be obvious to one of ordinary skill in the art without departing from the spirit and scope of the inventive concept. For example, the accelerating apparatus may comprise a rack gear 54 as shown in FIG. 1 or a rotary gear 38 as shown in FIG. 2. Also, the self-locking effect of the brake may be accomplished with serrations on the interfacing surfaces of the flyweights and housing. Therefore, it is intended that the scope of this invention be limited only by the appended claims.

What is claimed is:

1. A safety brake for limiting acceleration of an apparatus comprising:
   a pair of flyweights coupled together for providing a braking action in response to only an acceleration in a clockwise or a counterclockwise direction above a predetermined level;
   rotating means coupled between said flyweights and said apparatus for transferring said apparatus acceleration to said flyweights; and
   fixed housing means concentric with said rotating means and enclosing said flyweights for providing said braking action by said flyweights pivoting to contact said fixed housing means.

2. The safety brake as recited in claim 1 wherein:
   said flyweights become displaced relative to each other in response to exceeding said predetermined acceleration of said rotating means in either direction; and
   said displaced flyweights provide contact with an inside surface of said housing means causing frictional forces to stop said rotating means.

3. A safety brake for limiting acceleration of an apparatus comprising:
   a pair of semi-cylindrical flyweights coupled together for providing a braking action in response to only an acceleration in a clockwise or a counterclockwise direction above a predetermined level;
   spring means coupled between said pair of flyweights for centering said flyweights with respect to each other when said apparatus is not exceeding said predetermined acceleration level;
   rotating means coupled between said flyweights and said apparatus for transferring said apparatus acceleration to said flyweights; and
   fixed housing means conncentric with said rotating means and enclosing said flyweights for providing said braking action by said flyweights pivoting to contact said fixed housing means.

4. The safety brake as recited in claim 3 wherein:
   said flyweights become displaced relative to each other in response to exceeding said predetermined acceleration of said rotating means in either direction; and
   said displaced flyweights provide contact with an inside surface of said housing causing frictional forces to stop said rotating means.

5. The safety brake as recited in claim 3 wherein:
   said rotating means comprises a hub for attaching thereto said pair of flyweights using a pivot pin for each flyweight.

6. The safety brake as recited in claim 5 wherein:
   a ratio of a radius of one of said flyweights to a radius of a location of said pivot pin in said one of said flyweights being preselected to make said safety brake self-locking whereby an input torque from said apparatus to said safety brake causes a corresponding resistance torque to be developed by a frictional contact between said flyweights and said fixed housing means such that an increase in said input torque cannot overcome said resistance torque.

7. A safety brake for limiting acceleration of an apparatus comprising:
   a pair of pivoting semi-cylindrical flyweights for providing a braking action in response to only an acceleration in a clockwise or a counterclockwise direction above a predetermined level;
   spring means having a first portion positioned in a pocket of a first one of said pair of pivoting flyweights and a second portion positioned in a pocket of a second one of said pair of pivoting flyweights for centering said flyweights with respect to each other when said acceleration is below said predetermined level;
   rotating means coupled between said flyweights and said apparatus for transferring said apparatus acceleration to said flyweights, said rotating means and said flyweights being coupled together by a pair of driving pivot pins; and
   fixed housing means concentric with said rotating means and enclosing said flyweights for providing said braking action by said flyweights pivoting to contact said fixed housing means.

8. The safety brake as recited in claim 7 wherein:
   said flyweights become displaced relative to each other compressing said spring means in response to said acceleration of said rotating means; and
   said displaced flyweights provide contact with an inside surface of said housing causing frictional forces to stop said rotating means.

9. The safety brake as recited in claim 8 wherein:
   said frictional forces result in said safety brake being self-locking when a particular ratio of a radius of one of said flyweights to a radius of a location of said pivot pin in said one of said flyweights is preselected.

10. The safety brake as recited in claim 7 wherein:
    said rotating means comprises a hub positioned at one end of said rotating means for attaching thereto said pair of flyweights using said driving pins.

11. The safety brake as recited in claim 7 wherein:

said pocket for said spring means in each of said flyweights being located in flat adjacent surfaces of said flyweights.

12. The safety brake as recited in claim 8 wherein:
said compressed spring means provide forces for moving said flyweights back to a center position after said acceleration has exceeded and then falls below said predetermined level.

13. An equipment console including a moveable operator's shelf having a safety brake, said safety brake comprising:
rack and pinion gears coupled to said shelf for facilitating and sensing the motion of said shelf;
a pair of semi-cylindrical flyweights coupled together for providing a braking action in response to only an acceleration in a clockwise or a counterclockwise direction of said shelf above a predetermined level;
a spring coupled between said pair of flyweights in a compressed state for centering said flyweights with respect to each other when said shelf is not exceeding said predetermined acceleration level;
a hub coupled between said rack and pinion gears and said pair of flyweights for transferring said shelf acceleration to said flyweights; and
a fixed housing concentric with said hub and enclosing said flyweights for providing said braking action by said flyweights pivoting to contact said fixed housing means.

14. The equipment console as recited in claim 13 wherein:
said flyweights become displaced relative to each other in response to said predetermined acceleration of said shelf; and
said displaced flyweights provide contact with an inside surface of said housing causing frictional forces to stop the motion of said shelf.

15. The equipment console as recited in claim 13 wherein:
said hub comprises a pivot pin for each one of said flyweights.

16. The equipment console as recited in claim 15 wherein:
a ratio of a radius of one of said flyweights to a radius of a location of said pivot pin in said one of said flyweights being preselected to make said safety brake self-locking whereby an input torque from said apparatus to said safety brake causes a corresponding resistance torque to be developed by a frictional contact between said flyweights and said fixed housing means such that an increase in said input torque cannot overcome said resistance torque.

17. The equipment console as recited in claim 13 wherein:
a first portion of said spring is positioned in a pocket of a first one of said pair of flyweights and a second portion of said spring is positioned in a pocket of a second one of said pair of flyweights for centering said flyweights with respect to each other when said shelf acceleration is below said predetermined level.

18. The equipment console as recited in claim 17 wherein:
said pocket for said spring in each of said flyweights being located in a flat adjacent surface of each of said flyweights.

19. The equipment console as recited in claim 13 wherein:
said compressed spring provides forces for moving said flyweights back to a center position after said shelf acceleration has exceeded and then falls below said predetermined level.

20. A method of limiting acceleration of a moving apparatus with a safety brake comprising the steps of:
providing a pair of flyweights having a compressed spring positioned within a portion of each of said flyweights;
enclosing said pair of flyweights in a fixed housing concentric with said flyweights;
transferring said apparatus acceleration to said flyweights by rotating means; and
generating frictional forces to stop said moving apparatus by said flyweights pivoting to become displaced from a center position relative to each other in response to only a predetermined acceleration level in a clockwise or a counterclockwise direction and contacting an inside surface of said fixed housing.

21. The method as recited in claim 20 further comprising the step of:
returning said flyweights to a center position after said acceleration goes below said predetermined level causing said frictional forces to terminate.

22. The method as recited in claim 21 wherein:
said step of returning said flyweights to said center position results from forces on said flyweights generated by said compressed spring.

23. The method as recited in claim 17 wherein:
said step of generating frictional forces to stop said moving apparatus further comprises the step of preselecting a ratio of a radius of one of said flyweights to a radius of a location of said pivot pin in said one of said flyweights making said safety brake self-locking whereby an input torque from said apparatus to said safety brake causes a corresponding resistance torque to be developed by a frictional contact between said flyweights and said fixed housing means such that an increase in said input torque cannot overcome said resistance torque.

* * * * *